United States Patent
Henry et al.

(10) Patent No.: US 6,804,197 B1
(45) Date of Patent: Oct. 12, 2004

(54) CLOCK SWITCHING FOR A SYNCHRONOUS MEMORY IN NETWORK PROBE CIRCUITRY

(75) Inventors: Tim Warren Henry, Colorado Springs, CO (US); Rodney Ray Beeston, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 780 days.

(21) Appl. No.: 09/696,384

(22) Filed: Oct. 24, 2000

(51) Int. Cl.[7] .............................. H04J 3/14; G06E 11/00
(52) U.S. Cl. .................... 370/230.1; 370/252; 370/419; 340/3.3; 714/47
(58) Field of Search ......................... 370/229, 230–235, 370/242–248, 252, 253, 412, 419, 428; 340/3.3, 853.2; 714/47

(56) References Cited

U.S. PATENT DOCUMENTS 6,122,681 A * 9/2000 Aditya et al. ................. 710/52
6,163,270 A * 12/2000 Silverman ................... 340/3.3
6,243,829 B1 * 6/2001 Chan ............................. 714/7
2002/0105911 A1 * 8/2002 Pruthi et al. ................ 370/241

* cited by examiner

*Primary Examiner*—John Pezzlo
*Assistant Examiner*—Ahmed Elallam

(57) ABSTRACT

Network probe circuitry is disclosed that is comprised of a host interface system, a line interface system, a memory controller, and a memory. The memory controller receives clock signals from the host interface system and the line interface system. The memory controller grants one of the interface systems access to the memory and selects the clock signal corresponding to that interface system. The memory controller then transfers the selected clock signal to the memory. The interface system with access to the memory communicates with the memory based on the selected clock signal. The memory controller is advantageously faster than prior systems and can handle large data bursts.

16 Claims, 3 Drawing Sheets

CLOCK SWITCHING FOR A SYNCHRONOUS MEMORY IN NETWORK PROBE CIRCUITRY

BACKGROUND OF THE INVENTION

1. Field of the Invention

The invention is related to the field of network probes, and in particular, to network probe circuitry that switches between multiple clock signals to access a memory.

2. Statement of the Problem

Packet communications systems are experiencing dramatic growth in both speed and complexity. The primary engines of a packet network are the packet switches that form the nodes of the network. Packet switches are complex and expensive systems that actively process packet traffic for routing, billing, and network management. Packet switches typically require highly trained technical personnel to operate, and require fixed installations with environmentally-controlled floor space. Because of their size, cost, and complexity, packet switches may not represent the best system to monitor network performance.

Network probes are special purpose devices that have been developed to perform network monitoring external to the packet switches. Probes passively copy packet traffic from a network line and process the traffic to generate network performance statistics. Network probes offer several advantages over packet switch based solutions with respect to network monitoring. Probes are much cheaper and less complex than the typical packet switch. Probes can be positioned at a variety of network locations much easier than packet switches. Probes process copies of the packets, but do not need to actively process the packets that are received by the end users. In addition, probes are independent from the switches and may provide a more valid monitoring platform.

Network probes have used pre-configured circuitry to process traffic. Unfortunately, the pre-configured circuitry does not provide the programmability and data storage that is desired for today's rapidly changing multi-service packet networks. Network probes have also used general-purpose software processing to process traffic, but unfortunately, the increasing network speeds overwhelm competitively priced processors. Thus, network probe developers are faced with challenge of designing a network probe that is relatively cheap and simple to use, but has increased programmability and processing capacity.

Current network probe circuitry contains memory that is accessed by multiple processing systems. Often these processing systems operate at different clock rates. Consequently, the memory must be able to interface with the processing systems having the different clock rates. One solution to this problem is to operate the memory at a fixed clock rate and buffer data coming into the memory from the different processing systems. Some problems with using buffers are they are small, expensive, and slow down the access time to the memory. Another problem is that smaller buffers cannot handle large data bursts from the processing systems.

SUMMARY OF THE SOLUTION

The invention helps to solve the above problems with network probe circuitry that has a memory controller to switch clock signals transferred to a memory. The memory controller is advantageously faster than using a buffer and can handle large data bursts.

The network probe circuitry is comprised of a host interface system, a line interface system, a memory controller, and a memory. The line interface system copies packets from a network line to generate a data flow. The line interface system stores the data flow in the memory based on a first clock signal. The host interface system retrieves the data flow from the memory based on a second clock signal. The host interface system generates network performance statistics from the data flow. The memory controller receives the first clock signal and the second clock signal and selects one of the signals based on which of the interface systems has access to the memory. The memory controller transfers the selected clock signal to the memory.

DETAILED DESCRIPTION OF THE INVENTION

Figure 1:
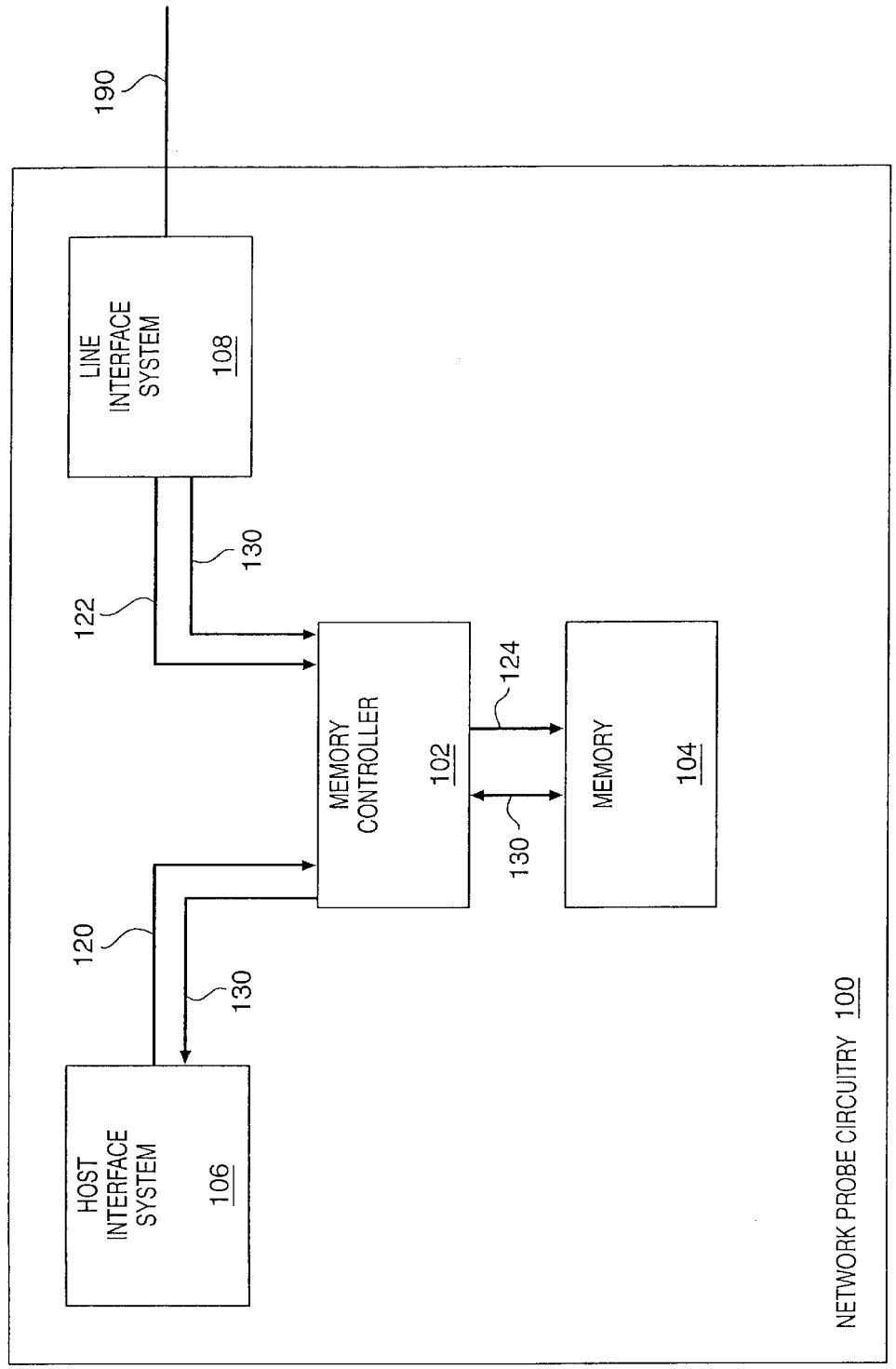
FIG. 1 is a block diagram that illustrates network probe circuitry with a memory controller in an example of the invention.
Figure 2:
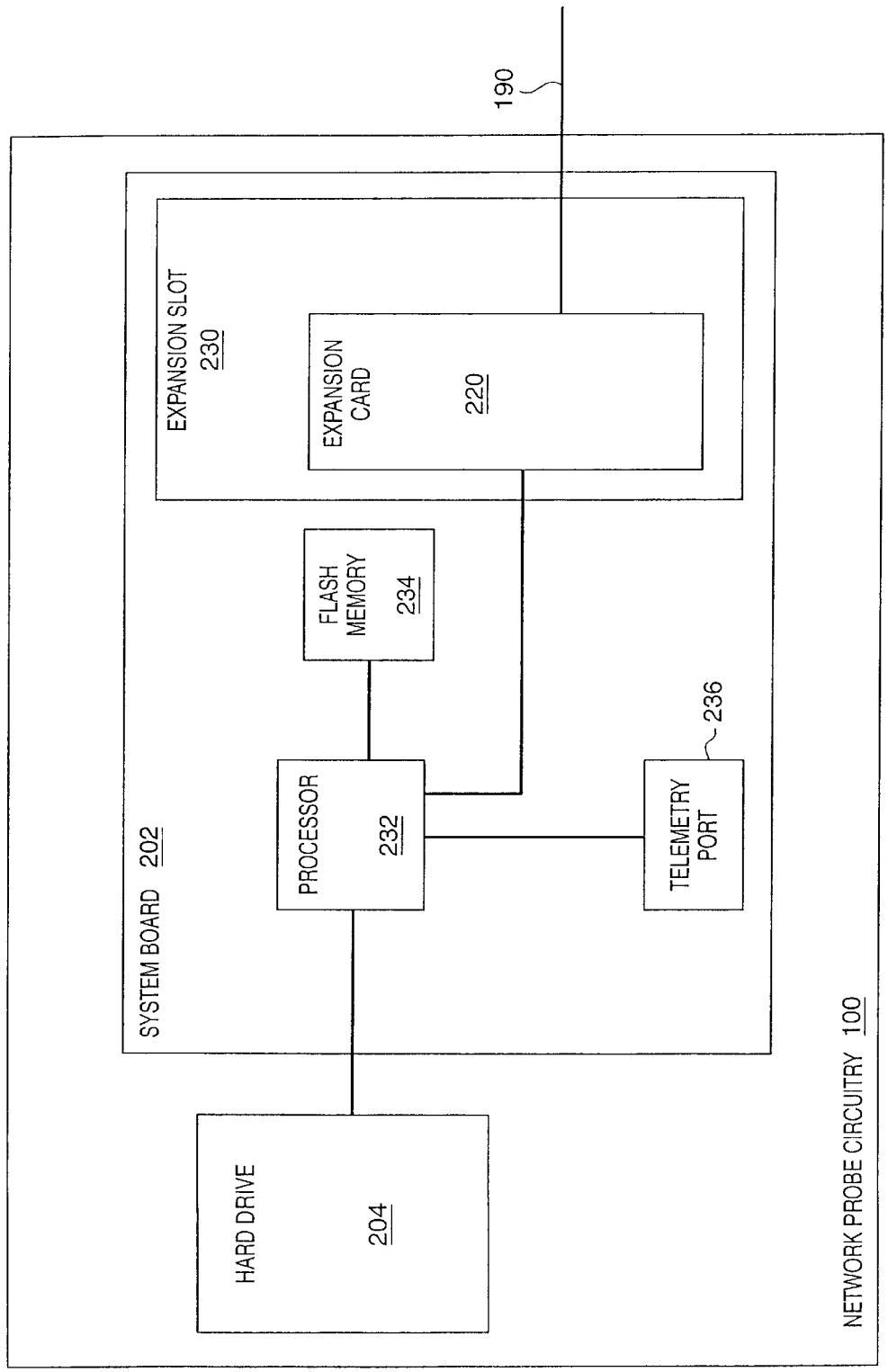
FIG. 2 is a block diagram that illustrates network probe circuitry implemented with a system board, a hard drive, and an expansion card in an example of the invention.
Figure 3:
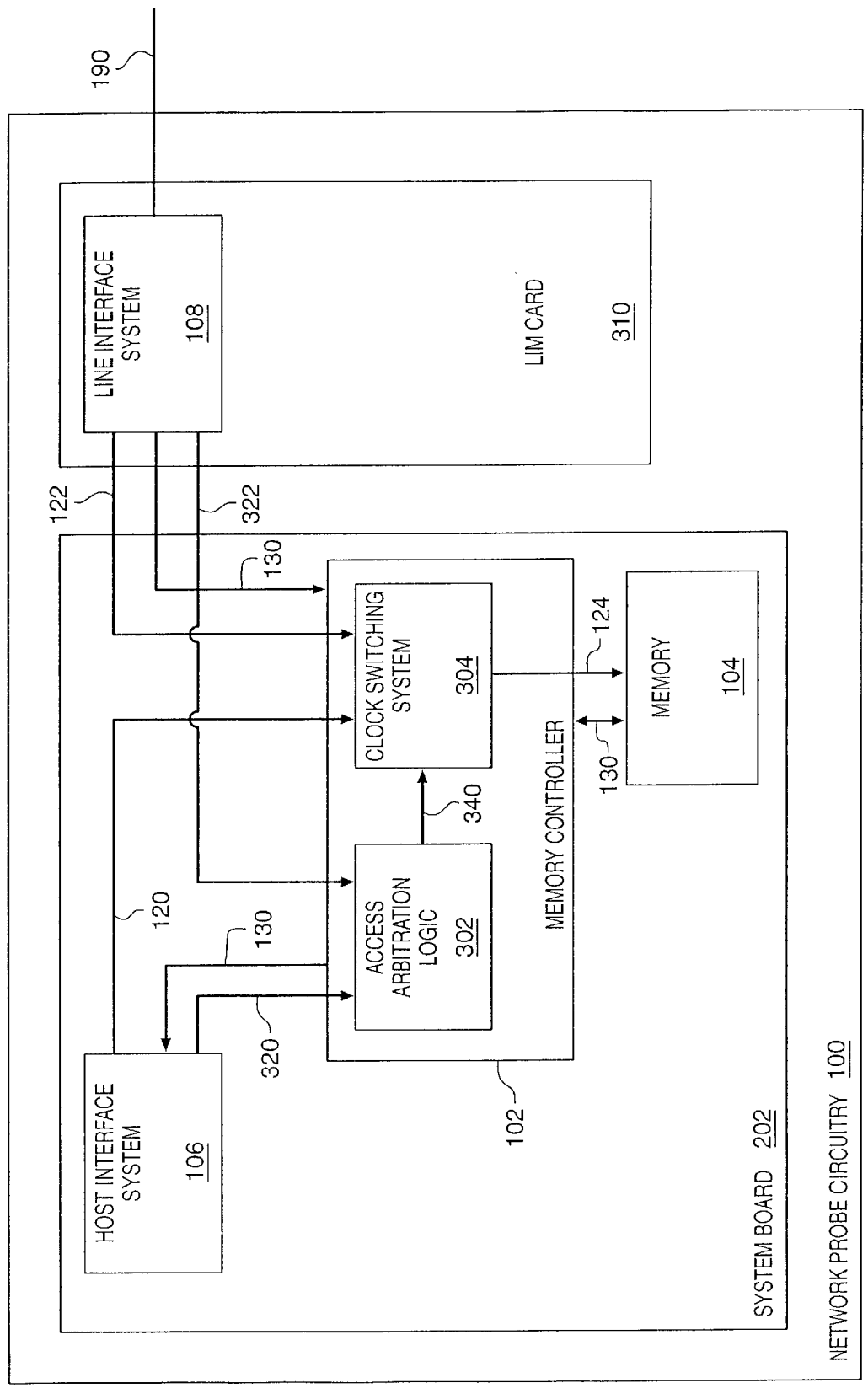
FIG. 3 is a block diagram that illustrates network probe circuitry with a memory controller in an example of the invention.

Network Probe Circuitry—FIGS. 1–3

FIGS. 1–3 depict examples of network probe circuitry 100 in accord with the present invention. Those skilled in the art will appreciate numerous variations from these examples that do not depart from the scope of the invention. Those skilled in the art will also appreciate that various features described could be combined with other embodiments to form multiple variations of the invention. Those skilled in the art will appreciate that some conventional aspects of network probe circuitry 100 have been simplified or omitted for clarity.

FIG. 1 shows an example of network probe circuitry 100 that is comprised of memory controller 102, memory 104, host interface system 106, and line interface system 108. Memory controller 102 is coupled to memory 104, host interface system 106, and line interface system 108. Line interface system 106 is coupled to network line 190. Those skilled in the art will understand that in some examples, host interface system 106 and line interface system 108 could be coupled to memory 104.

In operation, line interface system 108 copies packets from network line 190 to generate a data flow 130. Line interface system 108 stores the data flow 130 in memory 104 based on clock signal 122. Host interface system 106 retrieves the data flow 130 from memory 104 based on clock signal 120. Host interface system 106 generates network performance statistics based on the data flow 130.

Memory controller 102 controls whether line interface system 108 or host interface system 106 has access to memory 104 and whether clock signal 120 or clock signal 122 is transferred to memory 104. Memory controller 102 receives clock signal 120 from host interface system 106 and clock signal 122 from line interface system 108. Memory controller 102 selects clock signal 120 or clock signal 122 based on which interface system 106 or 108 has access to memory 104. Memory controller 102 transfers selected clock signal 124 to memory 104.

FIG. 2 shows an example of network probe circuitry 100 that is comprised of system board 202, hard drive 204, and expansion card 220. Expansion card 220 could be one or more expansion cards coupled together. System board 202 is comprised of processor 232, expansion slot 230, flash memory 234, and telemetry port 236. Expansion card 220 plugs into expansion slot 230. Processor 232 is connected to flash memory 234, telemetry port 236, hard drive 204, and expansion card 220. Expansion card 220 is connected to network line 190.

In operation, expansion card 220 copies packets from network line 290 to generate a data flow. Expansion card 220 transfers the data flow to processor 232. Flash memory 234 and hard drive 204 store network probe software. Processor 232 executes the network probe software read from flash memory 234 and hard drive 204 to process the data flow received from expansion card 220. Processor 232 generates network performance statistics from the data flow. Processor 232 stores the network performance statistics in hard drive 204. Processor 232 transfers the network performance statistics to telemetry port 236. Telemetry port 236 transfers the network performance statistics on demand to a management system.

FIG. 3 shows an example of network probe circuitry 100 that is comprised of system board 202 and Line Interface Module (LIM) card 310. LIM card 310 is an example of expansion card 220 in FIG. 2. System board 202 is comprised of memory controller 102, memory 104, and host interface system 106. Host interface system 106 could be a Peripheral Control Interface circuit. Memory controller 102 is comprised of access arbitration logic 302 and clock switching system 304. Memory controller 102 could be a gate array, a Field Programmable Gate Array (FPGA), or some other hardware system. LIM card 310 is comprised of line interface system 108. Line interface system 108 could be a Segmentation And Reassembly (SAR) circuit. Host interface system 106 is coupled to access arbitration logic 302 and clock switching system 304. Line interface system 108 is coupled to access arbitration logic 302, clock switching system 304, and network line 190. Access arbitration logic 302 is coupled to clock switching system 304. Clock switching system 304 is coupled to memory system 104.

In operation, line interface system 108 copies packets from network line 190 to generate a data flow 130. Line interface system 108 stores the data flow 130 in memory 104, using memory controller 102, based on clock signal 122. Host interface system 106 retrieves the data flow 130 from memory 104, using memory controller 102, based on clock signal 120. Host interface system 106 generates network performance statistics based on the data flow 130. The network performance statistics could be Remote Monitoring (RMON) data.

Before line interface system 108 stores the data flow 130 in memory 104 and host interface system 106 retrieves the data flow 130 from memory 104, they request access to memory 104 from memory controller 102. Host interface system 106 transfers clock signal 120 to clock switching system 304 and request signal 320 to access arbitration logic 302. Clock signal 120 represents the clock speed at which host interface system 106 operates. Request signal 320 is a request for access to memory 104. Line interface system 108 transfers clock signal 122 to clock switching system 304 and request signal 322 to access arbitration logic 302. Clock signal 122 represents the clock speed at which line interface system 108 operates. Request signal 322 is a request for access to memory 104.

Access arbitration logic 302 receives request signal 320 and request signal 322. Access arbitration logic 302 grants access to either host interface system 106 or line interface system 108 based on request signal 320 and request signal 322. For instance, request signals 320 and 322 could be bus signals where access arbitration logic 302 polls the bus signals to see which interface system wants access to memory 104. Access arbitration logic 302 generates control signal 340 and transfers control signal 340 to clock switching system 304. Control signal 340 tells clock switching system 304 whether host interface system 106 or line interface system 108 has access to memory 104.

Clock switching system 304 receives clock signal 120, clock signal 122, and control signal 340. Clock switching system 304 selects between clock signal 120 and clock signal 122 based on control signal 340, and transfers clock signal 120 or clock signal 122 to memory 104 as clock signal 124. For instance, if access arbitration logic 302 grants host interface system 106 access to memory 104, then clock switching system 304 transfers clock signal 120 as clock signal 124. When clock switching system 304 switches between clock signal 120 and clock signal 122 and vice-versa, clock switching system 304 forces clock signal 124 low for one full clock period before switching to a new clock signal. Clock switching system 304 therefore avoids transferring a glitch to memory 104. In the event that neither host interface system 106 nor line interface system 108 requests access to memory 104, clock switching system 304 selects the highest speed clock signal.

Memory 104 receives clock signal 124. Memory 104 could be a Synchronous Dynamic Random Access Memory (SDRAM) or any other synchronous memory. Memory 104 operates based on clock signal 124.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for operating a network probe circuitry to monitor a network, the method comprising:

copying data from a network line to generate a data flow in a line interface system and using a first clock signal to store the data flow in a memory;

retrieving the data flow from the memory with a host interface system using a second clock signal and transferring the data flow to a host system to generate network performance statistics for monitoring performance of the network, wherein the first clock signal and the second clock signal use different clock rates;

selecting one of the clock signals in a memory controller based on which of the interface systems has access to the memory; and transferring the one of the clock signals from the memory controller to the memory.

2. The method of claim 1 wherein the line interface system comprises a Segmentation And Reassembly circuit.

3. The method of claim 1 wherein the line interface system comprises an expansion card configured to plug into an expansion slot.

4. The method of claim 1 wherein the host interface system comprises a Peripheral Control Interface circuit.

5. The method of claim 1 wherein the memory comprises a Synchronous Dynamic Random Access Memory.

6. The method of claim 1 wherein the memory controller comprises a gate array.

7. The method of claim 1 wherein the memory controller comprises a Field Programmable Gate Array.

8. The method of claim 1 wherein the network performance statistics comprises Remote Monitoring (RMON) data.

9. Network probe circuitry, comprising:

a memory;

a line interface system configures to copy packets from a network line to generate a data flow and use a first clock signal to store the data flow in the memory;

a host interface system configured to use a second clock signal to retrieve the data flow from the memory and transfer the data flow to a host system to generate network performance statistics for monitoring performance of a network, wherein the first clock signal and the second clock signal have different clock rates; and a memory controller coupled to the line interface system, the host interface system, and the memory and configured to select one of the clock signals based on which of the interface systems has access to the memory and transfer the one of the clock signals to the memory.

10. The network probe circuitry of claim 9 wherein the line interface system comprises a Segmentation And Reassembly Circuit.

11. The network probe circuitry of claim 9 wherein the host interface system comprises a Peripheral Control Interface circuit.

12. The network probe circuitry of claim 9 wherein the line interface system comprises an expansion card configured to plug into an expansion slot.

13. The network probe circuitry of claim 9 wherein the memory comprises a Synchronous Dynamic Random Access Memory.

14. The network probe circuitry of claim 9 wherein the memory controller comprises a gate array.

15. The network probe circuitry of claim 9 wherein the memory controller comprises a Field Programmable Gate Array.

16. The network probe circuitry of claim 9 wherein the network performance statistics comprises Remote Monitoring (RMON) data.

* * * * *